(12) United States Patent
Niehaus

(10) Patent No.: US 10,107,057 B2
(45) Date of Patent: Oct. 23, 2018

(54) WELLHEAD ASSEMBLY HAVING INTEGRATED LOCKING RING

(71) Applicant: Q.E.D. Environmental Systems, Inc., Dexter, MI (US)

(72) Inventor: K. Lynn Niehaus, Manchester, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 123 days.

(21) Appl. No.: 15/219,849

(22) Filed: Jul. 26, 2016

(65) Prior Publication Data
US 2018/0030798 A1 Feb. 1, 2018

(51) Int. Cl.
*E21B 33/03* (2006.01)
*E21B 43/12* (2006.01)
*E21B 34/02* (2006.01)
*B09B 1/00* (2006.01)

(52) U.S. Cl.
CPC .............. *E21B 33/03* (2013.01); *B09B 1/006* (2013.01); *E21B 34/02* (2013.01); *E21B 43/12* (2013.01)

(58) Field of Classification Search
CPC ......... B09B 1/006; E21B 33/03; E21B 34/02; E21B 43/12
See application file for complete search history.

(56) References Cited

U.S. PATENT DOCUMENTS

| | | | |
|---|---|---|---|
| 3,480,302 A | 11/1969 | Jeffery et al. | |
| 3,489,439 A | * 1/1970 | Word, Jr. ................. | E21B 33/03 166/89.1 |
| 4,124,233 A | * 11/1978 | Ahlstone ................. | E02D 5/523 285/18 |
| 4,291,889 A | * 9/1981 | Hardcastle .............. | E21B 33/03 277/328 |
| 4,949,787 A | * 8/1990 | Brammer ................ | E21B 33/03 166/208 |
| 5,878,802 A | 3/1999 | Richter et al. | |

(Continued)

FOREIGN PATENT DOCUMENTS

CN 201024958 Y 2/2008
GB 2459195 A 10/2009

OTHER PUBLICATIONS

Extended European Search Report for corresponding European Patent Application No. 17183385.8 dated Nov. 17, 2017, 13 pp.

*Primary Examiner* — Yong-Suk Ro
(74) *Attorney, Agent, or Firm* — Harness, Dickey & Pierce, P.L.C.

(57) ABSTRACT

A wellhead assembly is disclosed which has a gas flow control valve with a tubular inlet into which a fluid from a well tube flows, and a gas flow line through which the fluid flows out from the gas flow control valve. An inlet tube has a first end operably coupled to the well tube, and a second coupled to the inlet of the valve. The inlet has a first groove formed on a surface thereof, and the inlet tube has a second groove formed on a surface thereof. A split lock ring is used which partially rests in, and which is substantially fully compressed into, one of the grooves, when the inlet tube is telescopically coupled to the inlet. The lock ring engages with the other one of the grooves as the two grooves become axially aligned during coupling, to lock the inlet tube to the inlet while permitting rotational movement of the inlet tube relative to the inlet.

16 Claims, 2 Drawing Sheets

(56) References Cited

U.S. PATENT DOCUMENTS

| | | | |
|---|---|---|---|
| 6,044,904 A | 4/2000 | Shafer | |
| 8,061,428 B2 | 11/2011 | Fenton et al. | |
| 2012/0000664 A1* | 1/2012 | Nas | E21B 33/085 166/344 |
| 2012/0160511 A1* | 6/2012 | Gette | E21B 33/03 166/368 |
| 2014/0096977 A1* | 4/2014 | Gette | E21B 33/03 166/379 |
| 2014/0182846 A1 | 7/2014 | Fischer et al. | |
| 2015/0204154 A1 | 7/2015 | McClinton et al. | |
| 2016/0069149 A1* | 3/2016 | Borak, Jr. | E21B 33/03 166/387 |
| 2016/0145960 A1* | 5/2016 | Gadre | E21B 33/03 166/75.14 |

\* cited by examiner

WELLHEAD ASSEMBLY HAVING INTEGRATED LOCKING RING

FIELD

The present disclosure relates to wellhead assemblies often used in landfill wells, and more particularly a wellhead assembly having an integrated locking ring that significantly expedites assembly of the well head onto a well pipe.

BACKGROUND

The statements in this section merely provide background information related to the present disclosure and may not constitute prior art.

Typically a wellhead assembly is attached to a well pipe. The well pipe leads into a well to some predetermined depth sufficient for the recovery of methane from the well. The wellhead forms an assembly, which typically includes a gas flow control valve, which allows a flow line or flow tube to be coupled to the wellhead so that methane gas flowing up through the well pipe and into the wellhead can be routed through the wellhead into the flow line and captured at some remote storage tank.

Typically the well head includes a gas flow control valve having a tubular inlet and a tubular outlet. The tubular inlet is typically connected via adhesives to an inlet tube, and the inlet tube is connected to a plate or similar structure at an upper end of the well pipe. The gas flow control valve helps a user to control a flow rate of the methane gas out through the wellhead.

The use of adhesives to construct a permanent adhesive joint between the tubular inlet of the gas control valve and an end of the inlet tube has certain drawbacks. The adhesive connection does not allow for rotational movement of wellhead assembly relative to the inlet tube. As a result, adjustable positioning of the gas flow line attached to the wellhead is not possible.

Still further, the use of adhesives is not ideal from a manufacturing standpoint. Adhesives tend to be somewhat messy, at least from an assembly standpoint. Often, ventilation has to be carefully controlled in the indoor work environment when doing assembly work indoors with various types of adhesive because of the harmful vapors that many types of adhesives give off. Assembly workers also may need to use gloves or otherwise wear clothing that is disposable in the event the adhesives accidentally are rubbed onto the worker's clothing. Time is typically needed for the adhesive joint to fully cure, and movement or jostling of the parts being joined prior to the adhesive joint becoming fully cured can prevent a strong adhesive joint from being formed between the parts being joined. And adhesives are generally less effective, and more likely to fail, when used on parts that will be exposed to extremely cold climates. Still further, the shelf life of certain adhesives has to be taken into account to make sure the adhesive is used in a timely fashion. In view of the foregoing, any assembly means for securing parts of a wellhead assembly together which does not involve the use of adhesives would be highly desirable from a manufacturing standpoint.

SUMMARY

In one aspect the present disclosure relates to a wellhead assembly. The wellhead assembly may comprise a gas flow control valve having a tubular inlet into which a fluid from a well tube flows, and a gas flow line through which the fluid flows out from the gas flow control valve. An inlet tube may be included which has a first end and a second end. The first end may be operably coupled to the well tube to receive the fluid flowing up from the well tube, and the second end may be coupled to the inlet of the gas flow control valve. The inlet may have a first groove formed on a surface thereof, and the inlet tube may have a second groove formed on a surface thereof. A split lock ring may be included which has a dimension sufficient to at least partially rest in one of the first or second grooves, and to be substantially fully compressed into the one of the first or second grooves when the second end of the inlet tube is telescopically coupled to the inlet. The lock ring may further be of a dimension sufficient to engage with the other one of the first or second grooves as the first and second grooves become axially aligned, to lock the inlet tube to the inlet while still permitting rotational movement of the inlet tube relative to the inlet.

In another aspect the present disclosure relates to a wellhead assembly. The wellhead assembly may comprise a gas flow control valve having a tubular inlet into which a fluid from a well tube flows, and a gas flow line through which the fluid flows out from the gas flow control valve. An inlet tube may be included which has a first end and a second end. The first end may be operably coupled to the well tube to receive the fluid flowing up from the well tube. The second end may be coupled to the inlet of the gas flow control valve. The inlet may also have a first groove formed on an inner surface thereof, while the inlet tube has a second groove formed on an outer surface thereof. A split lock ring may be included which has a dimension sufficient to at least partially rest in the first groove, and to be substantially fully compressed into the first groove when the second end of the inlet tube is telescopically coupled to the inlet. The lock ring may further be of dimensions to engage with the second groove as the first and second grooves become axially aligned when inserting the inlet tube into the inlet. This locks the inlet tube to the inlet while still permitting rotational movement of the inlet tube relative to the inlet.

In still another aspect the present disclosure relates to a wellhead assembly. The wellhead assembly may comprise a gas flow control valve having a tubular inlet into which a fluid from a well tube flows, and a gas flow line through which the fluid flows out from the gas flow control valve. An inlet tube may be provided which has a first end and a second end. The first end may be operably coupled to the well tube to receive the fluid flowing up from the well tube, and the second end may be coupled to the inlet of the gas flow control valve. The inlet may have a first groove formed on a surface thereof, while the inlet tube has a second groove formed on a surface thereof. The inlet tube may also have a tapered edge having a taper of between about 5 degrees and about 25 degrees. A split lock ring may be included which has a dimension sufficient to at least partially rest in one of the first or second grooves, and to be substantially fully compressed into the one of the first or second grooves when the second end of the inlet tube is telescopically coupled to the inlet. The lock ring may further be of dimensions to engage with the other one of the first or second grooves as the first and second grooves become axially aligned, to thus lock the inlet tube to the inlet while still permitting rotational movement of the inlet tube relative to the inlet.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
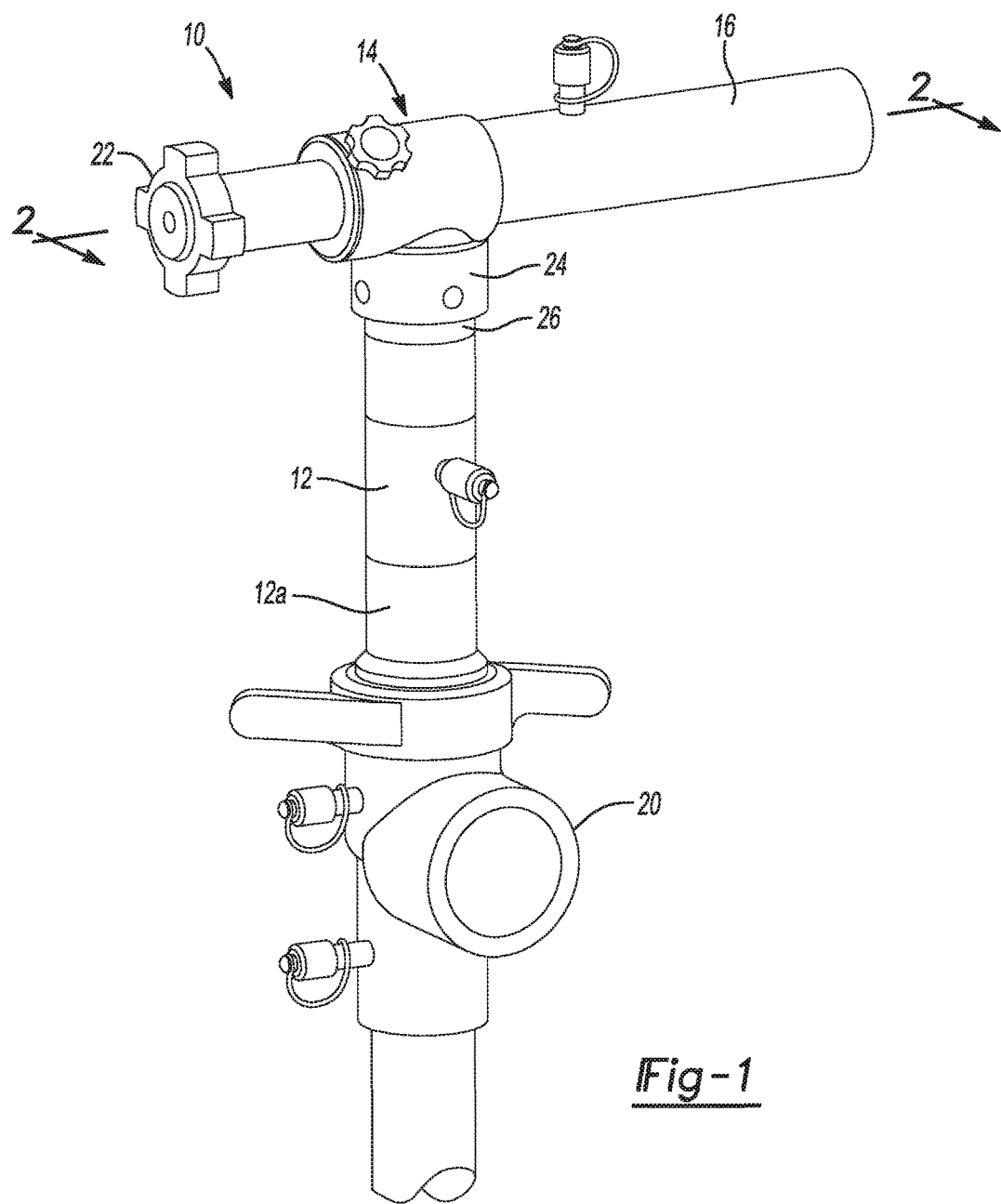
FIG. 1 is a perspective view of a wellhead assembly incorporating an integrated locking ring for securing a gas flow control valve portion to an inlet tube.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a wellhead assembly 10 in accordance with one embodiment of the present disclosure. The wellhead assembly 10 helps to control the flow of methane gas out from a well pipe (not shown) to which the wellhead assembly is attached. The well pipe is positioned in a well, which in this example would be a well at a landfill.

The wellhead assembly 10 includes an inlet tube 12, a gas flow control valve 14, and a gas flow line 16. In this example a first end 12a of the inlet tube 12 is shown coupled to an orifice plate assembly 18 which may contain an internal orifice plate (not shown) for further helping to regulate the flow of methane gas out of the well. A fitting 20, available from the assignee of the present application, which forms a flexible polymer cap, allows the inlet tube 12 to be quickly uncoupled from the orifice plate assembly 18 without wrenches or other tools The gas control valve 14 includes an adjustment knob 22 that may be turned to adjust a linear position of an internal valve element, which allows the user to tailor the flow of methane gas out from the well. An inlet 24 of the gas control valve 14 receives a second or distal end 26 of the inlet tube 12. The connection of the inlet tube 12 to the inlet 24 is the subject of the present application.

Figure 2:
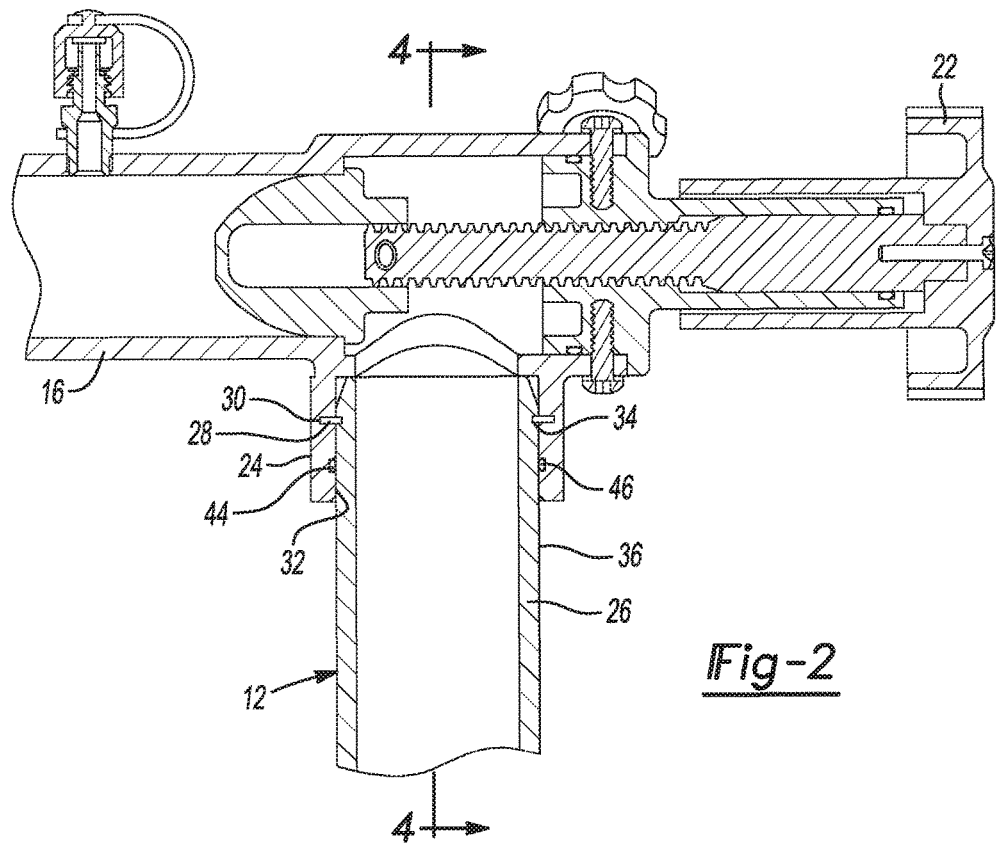
FIG. 2 is a cross sectional view of a portion of the wellhead assembly of FIG. 1 taken in accordance with section line 2-2 in FIG. 1.
Figure 3:
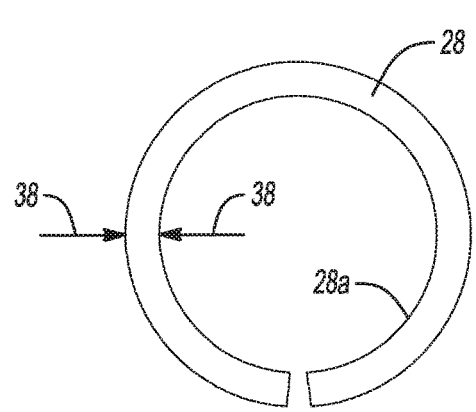
FIG. 3 is a plan view of the locking ring shown in FIGS. 2 and 3.
Figure 4:
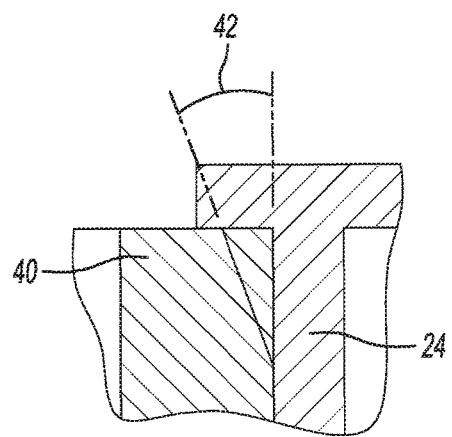
FIG. 4 is an enlarged view of an end portion of the inlet tube better illustrating the tapered edge of the end portion which helps to facilitate insertion of the inlet tube within the inlet of the gas flow control valve during manufacture of the wellhead assembly.

Referring to FIGS. 2 and 3, the attachment of the inlet tube 12 to the inlet 24 of the gas flow control valve 14 can be seen. The attachment is made by the cooperating engagement of a lock ring 28, a full 360 degree groove 30 formed on inside surface 32 of the inlet 24, and a full 360 degree circumferential groove 34 formed on an outer surface 36 of the inlet tube distal end 26. The lock ring 28 can be seen in greater detail in FIG. 3. The lock ring 28 diameter and its cross sectional wall thickness, as denoted by dimension arrow 38 in FIG. 3, is selected so that the lock ring 28 can be momentarily fully compressed within the groove 30 of the inlet 24 as the inlet 24 is slid onto the distal end 26 of the inlet tube 12. To help facilitate the sliding of the inlet 24 over the distal end 26 the distal end 26 includes a tapered end 40. The degree of taper of the tapered end 40, as indicated by angle 42 in FIG. 4, is preferably about 8-15 degrees, and more preferably about 12 degrees. This degree of taper needs to be selected to clear an inner edge 28a in FIG. 4 of the lock ring 28 when the lock ring is placed in the groove 30 on the inside of the inlet 24 and in its non-expanded configuration. Optionally, but preferably, one or more additional grooves 44 may also be formed on the outer surface 36 of the distal end 26 of the inlet tube 12, and one or more O-rings 46 disposed in the one or more grooves to facilitate a leak free seal.

To assemble the inlet tube 12 to the inlet 24 of the gas control valve 14 the lock ring 28 is first placed in the groove 20 on the inside surface 32 of the inlet 24. This involves just slightly compressing the lock ring 28 as it is inserted into the inlet 24 until it is moved axially within the inlet 24 and engages in the groove 30. The distal end 26 of the inlet tube 12 is then inserted into the inlet 24. As an outermost edge of the tapered end 40 of the inlet tube 12 makes contact with the inner edge 28a of the lock ring 28 the tapered end 40 expands the lock ring 28. The lock ring 28 is allowed to expand because of the depth of the groove 30, which is sufficiently deep to allow the entire thickness 38 (FIG. 3) of the lock ring to be received in the groove 30. As the inlet tube 12 is further inserted, the inside edge 28a rides over the tapered end 40 onto the outer surface 36 of the inlet tube 12 for a short axial distance before engaging in a "snapping" like action in the groove 34 in the outer surface 36 of the inlet tube 12. The depth of the groove 34 is such that the lock ring 28 will preferably be only just slightly expanded when resting in the groove 34; in other words the inner edge 28a will be just slightly biased into the groove 34. From the above it will be appreciated then that the depths of the grooves 30 and 34, and the cross sectional thickness 38 of the lock ring 28, will need to be considered together so that the lock ring can be expanded sufficiently to allow insertion of the inlet tube 12, and to allow the lock ring 28 to sufficiently engage in both of the grooves 30 and 34 when the inlet tube 12 is fully inserted into the inlet 24.

While the inlet tube 12 has been described as being telescopically inserted into the inlet 24, it will be appreciated that this telescopic connection could be reversed. That is, the groove 30 could be formed on an outer surface of the inlet 24, while the groove 34 could be formed on an inner surface of the distal end 26 of the inlet tube 12, and then the distal end 26 could be telescopically slid over the inlet 24 to make the telescopic connection between the inlet tube 12 and the inlet 24. And while the grooves 30 and 34 have been described as full 360 degree circumferential grooves, it will be appreciated that these grooves need not necessarily be formed as full 360 degree grooves. Instead, the grooves 30 and 34 could potentially be formed as grooves that extend over a shorter circumferential distance, for example 270 degrees, and a lock ring with a 270 degree arc used therewith.

The above-described attachment provided by the lock ring 28 eliminates the need to use adhesives and provides for a much easier, quicker and positive attachment of the inlet tube 12 to the gas control valve 14. The elimination of adhesives provides numerous other advantages, not the least of which is simplifying the assembly process, eliminating the vapors typically associated with adhesives, eliminating the cost of the adhesive itself, and eliminating the possibility of an adhesive bond breaking at some point during use of the wellhead assembly 10. A particular advantage of the attachment using the lock ring 28 is that the wellhead assembly 10 is able to swivel a full 360 degrees about the inlet tube 12.

This allows for a full 360 degrees of adjustable positioning of the gas flow control valve 14, and particular the gas flow line 16 (FIG. 1), so that the gas flow line 16 can be optimally routed by a technician in a desired direction towards a methane recovery system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A wellhead assembly, comprising:
  a gas flow control valve having a tubular inlet into which a fluid from a well tube flows, the well tube being positioned in a well at a landfill, and a gas flow line through which the fluid flows out from the gas flow control valve;
  an inlet tube having a first end and a second end, the first end being operably coupled to the well tube to receive the fluid flowing from the well tube, and the second end being coupled to the tubular inlet of the gas flow control valve;
  the tubular inlet having a first groove formed on a surface thereof;
  the inlet tube having a second groove formed on a surface thereof;
  a split lock ring having dimensions sufficient to at least partially rest in one of the first or second grooves, and to be substantially compressed into the one of the first or second grooves as the second end of the inlet tube is telescopically coupled to the tubular inlet; and
  the lock ring having dimensions to engage with the second groove as the first and second grooves become axially aligned, to lock the inlet tube to the tubular inlet while still permitting rotational movement of the inlet tube relative to the tubular inlet.

2. The wellhead assembly of claim 1, wherein the inlet tube includes a tapered edge at the second end.

3. The wellhead assembly of claim 2, wherein the tapered edge has a taper of about 5 degrees to about 25 degrees relative to an outer surface of the inlet tube.

4. The wellhead assembly of claim 1, wherein the one of the first or second grooves is formed on an inner surface of the tubular inlet of the gas flow control valve.

5. The wellhead assembly of claim 1, wherein the other one of the first and second grooves is formed on an outer surface of the second end of the inlet tube.

6. The wellhead assembly of claim 1, wherein the one of the first and second grooves forms a full 360 degree circumferential groove.

7. The wellhead assembly of claim 1, wherein the other one of the first and second grooves forms a fully 360 degree circumferential groove.

8. The wellhead assembly of claim 1, further comprising a third groove formed on one of the tubular inlet or the inlet tube, and an O-ring seal disposed in the third groove for providing a leak free seal between the tubular inlet and the inlet tube.

9. A wellhead assembly, comprising:
  a gas flow control valve having a tubular inlet into which a fluid from a well tube flows, the well tube being positioned in a well at a landfill, and a gas flow line through which the fluid flows out from the gas flow control valve;
  an inlet tube having a first end and a second end, the first end being operably coupled to the well tube to receive the fluid flowing from the well tube, and the second end being coupled to the tubular inlet of the gas flow control valve;
  the tubular inlet having a first groove formed on an inner surface thereof;
  the inlet tube having a second groove formed on an outer surface thereof, and a tapered edge;
  a split lock ring having dimensions sufficient to at least partially rest in the first groove, and to be substantially compressed into the first groove as the second end of the inlet tube is telescopically coupled to the tubular inlet; and
  the lock ring having dimensions to engage with the second groove as the first and second grooves become axially aligned as the inlet tube is inserted into the tubular inlet, to thus lock the inlet tube to the tubular inlet while still permitting rotational movement of the inlet tube relative to the tubular inlet.

10. The wellhead assembly of claim 9, wherein the first groove forms a full 360 degree groove.

11. The wellhead assembly of claim 9, wherein the second groove forms a full 360 degree groove.

12. The wellhead assembly of claim 9, wherein the tapered edge forms an angle of about 5 degrees to about 25 degrees relative to an outer surface of the inlet tube.

13. The wellhead assembly of claim 9, further comprising a third groove formed on one of the tubular inlet or the inlet tube, and an O-ring seal disposed in the third groove for providing a leak free seal between the tubular inlet and the inlet tube.

14. A wellhead assembly, comprising:
  a gas flow control valve having a tubular inlet into which a fluid from a well tube flows, the well tube being positioned in a well at a landfill, and a gas flow line through which the fluid flows out from the gas flow control valve;
  an inlet tube having a first end and a second end, the first end being operably coupled to the well tube to receive the fluid flowing from the well tube, and the second end being coupled to the tubular inlet of the gas flow control valve;
  the tubular inlet having a first groove formed on a surface thereof;
  the inlet tube having a second groove formed on a surface thereof, and a tapered edge having a taper of between about 5 degrees and about 25 degrees;
  a split lock ring having dimensions sufficient to at least partially rest in one of the first or second grooves, and to be substantially compressed into the one of the first or second grooves as the second end of the inlet tube is telescopically coupled to the tubular inlet; and
  the lock ring having dimensions sufficient to engage with the second groove as the first and second grooves become axially aligned, to lock the inlet tube to the tubular inlet while still permitting rotational movement of the inlet tube relative to the tubular inlet.

15. The wellhead assembly of claim 14, wherein the surface of the tubular inlet forms an inner surface, and the surface on the inlet tube forms an outer surface, and wherein the one of the first or second grooves is formed on the inner surface of the tubular inlet, and the other one of the first or second grooves is formed on the outer surface of the inlet tube.

16. The wellhead assembly of claim 14, further comprising a third groove formed on one of the tubular inlet or the inlet tube, and an O-ring seal disposed in the third groove for providing a leak free seal between the tubular inlet and the inlet tube.

* * * * *